United States Patent
Li et al.

(10) Patent No.: US 10,792,615 B2
(45) Date of Patent: Oct. 6, 2020

(54) CATALYZED FILTERS WITH END COATING FOR LEAN ENGINE EXHAUST

(71) Applicant: BASF Corporation, Florham Park, NJ (US)

(72) Inventors: Yuejin Li, Edison, NJ (US); Stanley A. Roth, Yardley, PA (US)

(73) Assignee: BASF Corporation, Florham Park, NJ (US)

( * ) Notice: Subject to any disclaimer, the term of this patent is extended or adjusted under 35 U.S.C. 154(b) by 237 days.

(21) Appl. No.: 15/562,628

(22) PCT Filed: Mar. 30, 2016

(86) PCT No.: PCT/US2016/024889
§ 371 (c)(1),
(2) Date: Sep. 28, 2017

(87) PCT Pub. No.: WO2016/160915
PCT Pub. Date: Oct. 6, 2016

(65) Prior Publication Data
US 2018/0353905 A1    Dec. 13, 2018

Related U.S. Application Data

(60) Provisional application No. 62/140,126, filed on Mar. 30, 2015.

(51) Int. Cl.
*B01D 46/24*     (2006.01)
*B01D 53/94*     (2006.01)
(Continued)

(52) U.S. Cl.
CPC ..... *B01D 53/9418* (2013.01); *B01D 46/2459* (2013.01); *B01D 53/944* (2013.01); *B01D 53/9422* (2013.01); *B01D 53/9431* (2013.01); *B01D 53/9472* (2013.01); *B01D 53/9477* (2013.01); *B01J 23/44* (2013.01); *B01J 29/763* (2013.01); *B01J 35/0006* (2013.01);
(Continued)

(58) Field of Classification Search
None
See application file for complete search history.

(56) References Cited

U.S. PATENT DOCUMENTS

2007/0110650 A1    5/2007  Pfeifer et al.
2010/0058745 A1    3/2010  Kim
(Continued)

FOREIGN PATENT DOCUMENTS

JP    2005334842    8/2005
JP    2008093504    4/2008
(Continued)

*Primary Examiner* — Colin W. Slifka
(74) *Attorney, Agent, or Firm* — Womble Bond Dickinson (US) LLP (57) ABSTRACT

Provided are catalyst articles, methods of manufacturing catalyst articles, and methods for controlling emissions in diesel engine exhaust streams with catalyst articles, where the emission treatment system of various embodiments effectively treats diesel engine exhaust with a catalyst article. In one or more embodiments, the catalyst articles have a platinum group metal end coating covering an outlet end surface of the catalytic article. In one or more embodiments, a method is provided where an applicator transfers a platinum group metal coating to an outlet end face of a catalytic article.

25 Claims, 4 Drawing Sheets

(51) Int. Cl.
    *B01J 23/44*     (2006.01)
    *B01J 29/76*     (2006.01)
    *B01J 35/00*     (2006.01)
    *B01J 35/04*     (2006.01)
    *B01J 37/02*     (2006.01)
    *F01N 13/00*     (2010.01)
    *F01N 3/035*     (2006.01)
    *F01N 3/20*     (2006.01)

(52) U.S. Cl.
    CPC ........... *B01J 35/04* (2013.01); *B01J 37/0246* (2013.01); *F01N 3/035* (2013.01); *F01N 3/2066* (2013.01); *F01N 13/009* (2014.06); *B01D 2255/102* (2013.01); *B01D 2255/104* (2013.01); *B01D 2255/1023* (2013.01); *B01D 2255/2063* (2013.01); *B01D 2255/2065* (2013.01); *B01D 2255/2073* (2013.01); *B01D 2255/20723* (2013.01); *B01D 2255/20738* (2013.01); *B01D 2255/20746* (2013.01); *B01D 2255/20753* (2013.01); *B01D 2255/20761* (2013.01); *B01D 2255/50* (2013.01); *B01D 2255/9032* (2013.01); *B01D 2255/9035* (2013.01); *B01D 2255/9155* (2013.01); *F01N 2510/068* (2013.01); *F01N 2610/02* (2013.01)

(56) References Cited

U.S. PATENT DOCUMENTS

| | | |
|---|---|---|
| 2010/0175372 A1 | 7/2010 | Lambert et al. |
| 2010/0223919 A1 | 9/2010 | Lee et al. |
| 2013/0095013 A1 | 4/2013 | Banno et al. |
| 2013/0149223 A1 | 6/2013 | Blakeman et al. |

FOREIGN PATENT DOCUMENTS

| | | |
|---|---|---|
| WO | WO 99/37896 | 7/1999 |
| WO | WO 2010/114873 | 10/2010 |
| WO | WO 2011/041769 | 4/2011 |
| WO | WO 2012/135871 | 10/2012 |

CATALYZED FILTERS WITH END COATING FOR LEAN ENGINE EXHAUST

CROSS-REFERENCE TO RELATED APPLICATIONS

The present application is a U.S. National Stage of International Patent Application PCT/US2016/024889, filed Mar. 30, 2016 and claims priority to U.S. Provisional Patent Application No. 62/140,126, filed Mar. 30, 2015. The disclosures of each of the applications noted above are incorporated herein by reference in their entirety.

TECHNICAL FIELD OF THE INVENTION

The present invention relates generally to catalyst articles, emission treatment systems, and methods of treating exhaust gas. In particular, the invention relates to such articles, systems, and methods for treating diesel engine exhaust gas.

BACKGROUND OF THE INVENTION

Engine exhaust and, in particular, diesel engine exhaust is a heterogeneous mixture which contains not only gaseous emissions such as carbon monoxide ("CO"), unburned hydrocarbons ("HC") and nitrogen oxides ("$NO_x$"), but also condensed phase materials (liquids and solids) which are commonly referred to as particulates or particulate matter. Regulated species of exhaust emissions include carbon monoxide (CO), oxides of nitrogen ($NO_x$); hydrocarbons (HCs), and particulate matter (PM).

Often, catalyst compositions and substrates on which the compositions are disposed are provided in diesel engine exhaust systems to convert certain or all of these exhaust components to innocuous components. For example, diesel exhaust systems can contain one or more of a diesel oxidation catalyst, a soot filter and a catalyst for the reduction of $NO_x$.

Oxidation catalysts that contain platinum group metals, base metals and combinations thereof are known to facilitate the treatment of diesel engine exhaust by promoting the conversion of both HC and CO gaseous pollutants and some proportion of the particulate matter through oxidation of these pollutants to carbon dioxide and water. Such catalysts have generally been contained in units called diesel oxidation catalysts (DOC's), which are placed in the exhaust of diesel engines to treat the exhaust before it vents to the atmosphere. In addition to the conversion of gaseous HC, CO and particulate matter, oxidation catalysts that contain platinum group metals (which are typically dispersed on a refractory oxide support) also promote the oxidation of nitric oxide (NO) to $NO_2$.

The total particulate matter (TPM) emissions of diesel exhaust are comprised of three main components. One component is the dry, solid carbonaceous fraction or soot fraction. This dry carbonaceous matter contributes to the visible soot emissions commonly associated with diesel exhaust. A second component of the particulate matter is the soluble organic fraction ("SOF"). The soluble organic fraction is sometimes referred to as the volatile organic fraction ("VOF"), which terminology will be used herein. The VOF can exist in diesel exhaust either as a vapor or as an aerosol (fine droplets of liquid condensate), depending on the temperature of the diesel exhaust. It is generally present as condensed liquids at the standard particulate collection temperature of 52° C., in diluted exhaust, as prescribed by a standard measurement test, such as the U.S. Heavy Duty Transient Federal Test Procedure. These liquids arise from two sources: (1) lubricating oil swept from the cylinder walls of the engine each time the pistons go up and down; and (2) unburned or partially burned diesel fuel. The third component of the particulate matter is a so-called sulfate fraction. The sulfate fraction is formed from small quantities of sulfur components present in the diesel fuel and lubricating oil. During combustion, the sulfur components of the diesel fuel and oil form gaseous $SO_2$ and $SO_3$. As the exhaust cools, $SO_3$ combines rapidly with water to form sulfuric acid, $H_2SO_4$. The sulfuric acid forms an aerosol that collects as a condensed phase with the carbon particulates, or is adsorbed onto the other particulate components, and thereby adds to the mass of TPM.

One key after-treatment technology in use for high particulate matter reduction is the diesel particulate filter (DPF). There are many known filter structures that are effective in removing particulate matter from diesel exhaust, such as honeycomb wall flow filters, wound or packed fiber filters, open cell foams, sintered metal filters, etc. However, ceramic wall flow filters, described below, receive the most attention. These filters are capable of removing over 90% of the solid carbonaceous particulate material from diesel exhaust. The filter is a physical structure for removing particles from exhaust, and the accumulating particles will increase the back pressure from the filter on the engine. Thus, the accumulating particles have to be continuously or periodically burned out of the filter to maintain an acceptable back pressure. Unfortunately, the carbon soot particles require temperatures in excess of 500° C. to burn under oxygen-rich (lean) exhaust conditions. This temperature is higher than that typically present in diesel exhaust.

Accordingly, provisions are generally made to increase exhaust temperature in order to provide for active regeneration of the filter. The presence of a catalyst associated with the filter provides for CO, HC and NO oxidation within the filter and an increase in the rate of soot combustion. In this way, a catalyzed soot filter (CSF) or catalyzed diesel particulate filter (CDPF) is effective in providing for >90% particulate matter reduction along with active burning of the accumulating soot.

Another mechanism for the removal of particles is the use of $NO_2$ in the exhaust stream as an oxidant. Thus, particulates may be removed by oxidation employing $NO_2$ as an oxidant at temperatures above 300° C. The $NO_2$ already in the exhaust from the engine may be supplemented through oxidation of NO also in the exhaust through the use of an upstream DOC oxidation catalyst. This passive regeneration mechanism can further reduce the soot load in a filter and decrease the number of active regeneration cycles.

Future emissions standards adopted throughout the world will also address $NO_x$ reductions from diesel exhaust. A proven $NO_x$ abatement technology applied in heavy-duty mobile emission systems since 2006 in Europe and since 2010 in the US with lean diesel exhaust conditions is Selective Catalytic Reduction (SCR). In this process, $NO_x$ is reduced with ammonia ($NH_3$) to nitrogen ($N_2$) over a catalyst typically composed of base metals. The technology is capable of $NO_x$ reduction greater than 90%, and thus it represents one of the best approaches for achieving aggressive $NO_x$ reduction goals. SCR for mobile applications uses urea (typically present in an aqueous solution) as the source of ammonia. SCR provides efficient conversions of $NO_x$ as long as the exhaust temperature is within the active temperature range of the catalyst.

While separate substrates, each containing catalysts to address discrete components of the exhaust, can be provided in an exhaust system, use of fewer substrates is desirable to reduce the overall size of the system, to ease the assembly of the system, and to reduce the overall cost of the system. One approach to achieve this goal is to coat a soot filter with a catalyst composition effective for the conversion of $NO_x$ to innocuous components (giving an SCR-catalyzed soot filter) . An SCR-catalyzed soot filter assumes two catalyst functions: removal of the particulate component of the exhaust stream and conversion of the $NO_x$ component of the exhaust stream to $N_2$.

Coated soot filters that can achieve $NO_x$ reduction goals require a sufficient loading of SCR catalyst composition on the soot filter. Gradual reduction in the catalytic effectiveness of the compositions that occurs over time through exposure to certain deleterious components of the exhaust stream augments the need for higher catalyst loadings of the SCR catalyst composition. However, preparation of coated soot filters with higher catalyst loadings can lead to unacceptably high back pressure within the exhaust system. Coating techniques that allow higher catalyst loadings on the wall flow filter, yet still allow the filter to maintain flow characteristics that achieve acceptable back pressures, are therefore desirable.

An additional aspect for consideration in coating wall flow filters is the selection of the appropriate SCR catalyst composition. First, the catalyst composition must be durable so that it maintains its SCR catalytic activity even after prolonged exposure to higher temperatures that are characteristic of filter regeneration. For example, combustion of the soot fraction of the particulate matter often involves temperatures above 700° C. Such temperatures render many commonly used SCR catalyst compositions (such as mixed oxides of vanadium and titanium) less catalytically effective. Second, the SCR catalyst compositions preferably have a wide enough operating temperature range so that they can accommodate the variable temperature ranges over which the vehicle operates. Temperatures below 300° C. are typically encountered, for example, at conditions of low load, or at engine startup. An SCR catalyst composition is preferably capable of catalyzing the reduction of the $NO_x$ component of the exhaust to achieve $NO_x$ reduction goals, even at lower exhaust temperatures.

Ammonia can slip through a filter coated with an SCR catalyst composition, and therefore, there is often a need to provide a downstream catalyst to oxidize such slipped ammonia. An ammonia oxidation catalyst comprising a platinum group metal can be placed as a washcoat on the outlet end of a wall flow filter to oxidize ammonia. Coatings to wall flow filters are applied by vertically immersing a wall flow substrate in a catalyst slurry of solid particles in a liquid to provide a washcoat carried by the wall elements of the wall flow filter. Depending on a variety of factors, the washcoat permeates the walls, which means that washcoat penetrates into at least a majority of the hollow regions within the wall thickness, and becomes deposited on the internal surfaces throughout the thickness of the walls. Alternatively, the washcoat may be carried on an outside surface of the wall. In either case, the capillary action of the slurry when the wall flow monolith is immersed in the slurry makes it difficult to precisely control the length of the coating applied to the wall flow filter. When the entire filter is to be coated with the catalyst composition, this is not of concern. However, when two or more catalyst compositions are applied to a wall flow filter, it may be desirable to precisely control the extent to which a coating extends from an end of the wall flow filter to minimize negative interaction of catalyst components. For example, it may be desirable to provide a wall flow filter having an SCR catalyst composition extending from the inlet end of the filter and an oxidation catalyst composition extending from the outlet end of the filter, wherein the two coatings are applied to minimize interaction of the SCR catalyst components and the oxidation catalyst components.

There remains a need in the art for catalyst articles, methods and systems to treat the carbon monoxide, nitrogen oxides, hydrocarbons and particulate matter from a diesel engine in an effective and inexpensive manner while simultaneously minimizing required space in the exhaust system. There is also a need to provide catalyst articles, methods and system which minimize negative interactions between different coating compositions.

SUMMARY OF THE INVENTION

Various embodiments are listed below. It will be understood that the embodiments listed below may be combined not only as listed below, but in other suitable combinations in accordance with the scope of the invention.

Embodiments of the invention are directed to catalyzed particulate filters for diesel exhaust emission control, to abate one or more of the main emissions in the exhaust, i.e., CO, HC, $NO_x$, soot, $NH_3$ and $H_2S$ using a single catalytic article. In some embodiments, the disclosure provides multi-zone catalyst articles, methods of manufacturing multi-zone catalyst articles, and methods for controlling emissions in lean burn (e.g., diesel) engine exhaust streams with multi-zone catalyst articles. In some embodiments, emission treatment systems can be provided which can effectively treat diesel engine exhaust using a single multi-zone catalyst article.

A first embodiment relates to a catalyzed particulate filter comprising a plurality of porous walls extending longitudinally to form a plurality of parallel passages extending from an inlet end to an outlet end, wherein a quantity of the passages are inlet passages that are open at the inlet end and closed with an outlet plug at the outlet end, and a quantity of passages are outlet passages that are closed with an inlet plug at the inlet end and open at the outlet end, the outlet plug having a depth and an outlet plug end face, the outlet end defining an outlet end surface of the outlet passages including the outlet plug and the outlet plug end face; a selective catalytic reduction (SCR) catalyst applied to the porous walls of the particulate filter; and a platinum group metal (PGM) end coating covering the outlet end surface and the outlet end face of the plugs, the platinum group metal (PGM) end coating which extends a distance less than 1.5 times the depth of the outlet plugs from the outlet end surface and having a platinum group metal (PGM) local loading in the range of about 20 to about 200 $g/ft^3$. In a second embodiment, the catalyzed particulate filter of the first embodiment is modified such that the plugs at the outlet end have a length in the range of about 3 mm to about 8 mm.

In a third embodiment, the catalyzed particulate filter of the first and second embodiments is modified such that the platinum group metal end coating is end face applied by an applicator to only the outlet end surface and the outlet end face of the plugs. In a fourth embodiment, the catalyzed particulate filter of the third embodiment is modified such that the applicator is selected from the group consisting of a brush, a roller, a squeegee, and a stamp pad. In a fifth embodiment, the catalyzed particulate filter of the second and third embodiments is modified such that the applicator is a roller.

In a sixth embodiment, the catalyzed particulate filter of the first through fifth embodiments is modified such that the platinum group metal end coating extends a distance equal to or less than the distance of the depth of the outlet plugs from the outlet end surface. In an seventh embodiment, the catalyzed particulate filter of the first through sixth embodiments is modified such that the platinum group metal end coating loading is in the range of about 20 g/ft$^3$ to about 150 g/ft$^3$. In an eighth embodiment, the catalyzed particulate filter of the first through seventh embodiments is modified such that the platinum group metal for the end coating is palladium.

In a ninth embodiment, the catalyzed particulate filter of the first through eighth embodiments is modified such that the filter further comprises an oxidation catalyst washcoat comprising platinum group metal extending from the outlet end of the passages and for a depth in the range of greater than about 10% to about 50% of the wall length. In a tenth embodiment, the catalyzed particulate filter of the first through ninth embodiments is modified such that the selective catalytic reduction catalyst coating extends the entire length of the porous walls.

In an eleventh embodiment, the catalyzed particulate filter of the first through tenth embodiments is modified such that the selective catalytic reduction catalyst coating permeates the porous walls. In a twelfth embodiment, the catalyzed particulate filter of the first through eleventh embodiments is modified such that the selective catalytic reduction catalyst overlaps with the oxidation catalyst washcoat. In a thirteenth embodiment, the catalyzed particulate filter of the first through twelfth embodiments is modified such that the oxidation catalyst washcoat overlaps with the selective catalytic reduction catalyst.

In a fourteenth embodiment, the catalyzed particulate filter of the first through thirteenth embodiments is modified such that the selective catalytic reduction catalyst comprises a molecular sieve promoted with a base metal. In a fifteenth embodiment, the catalyzed particulate filter of the first through fourteenth embodiments is modified such that the selective catalytic reduction catalyst is a zeolitic framework material promoted with a metal selected from Cu, Fe, Co, Ni, La, Ce, Mn, V, Ag, and combinations thereof. In a sixteenth embodiment, the catalyzed particulate filter of the first through fifteenth embodiments is modified such that the selective catalytic reduction catalyst is a zeolite of the CHA framework promoted with a metal selected from Cu, Fe and combinations thereof. In a seventeenth embodiment, the catalyzed particulate filter of the first through sixteenth embodiments is modified such that the platinum group metal end coating is the only platinum group metal coating on the catalyzed particulate filter.

In an eighteenth embodiment, a lean burn engine exhaust system comprises a diesel oxidation catalyst upstream from the catalyzed particulate filter of any of the first through seventeenth embodiments. In a nineteenth embodiment, a lean burn engine exhaust system comprises a lean NOx trap upstream from the catalyzed particulate filter of any of the first through seventeenth embodiments.

In a twentieth embodiment, a method of making a catalyzed soot filter comprises: coating the catalyzed soot filter including a plurality of porous walls extending longitudinally to form a plurality of parallel passages extending from an inlet end to an outlet end, wherein a quantity of the passages are inlet passages that are open at the inlet end and closed with an outlet plug at the outlet end, and a quantity of passages are outlet passages that are closed with an inlet plug at the inlet end and open at the outlet end, the outlet plug having a depth and an outlet plug end face, the outlet end defining an outlet end surface including the outlet plug end face; wherein coating the catalyzed soot filter includes washcoating a selective catalytic reduction catalyst washcoat on the porous walls of the particulate filter; and contacting the outlet plug end face and outlet end surface with an applicator containing a platinum group metal coating so that the platinum group metal coating is transferred from the applicator to the outlet plug end faces and outlet end surfaces.

In a twenty-first embodiment, the twentieth embodiment is modified such that the platinum group metal coating extends a distance less than 1.5 times the depth of the outlet plugs from the outlet end surface. In a twenty-second embodiment, the twentieth embodiment is modified such that the platinum group metal coating extends a distance equal to or less than the depth of the outlet plugs. In a twenty-third embodiment, the twentieth through twenty-second embodiments are modified such that the platinum group metal coating has a viscosity which prevents the coating from travelling along the axial length of the porous walls when the platinum group metal coating is transferred from the applicator to the end plug end faces and outlet end surfaces of the porous walls. In a twenty-fourth embodiment, the twentieth through twenty-third embodiments are modified such that the applicator is selected from the group consisting of a brush, a roller, a squeegee, and a stamp pad. In a twenty-fifth embodiment, the twentieth through twenty-fourth embodiments are modified such that, wherein the applicator is a roller. In a twenty-sixth embodiment, the twentieth through twenty-fifth embodiments are modified such that the method further comprises washcoating an oxidation catalyst washcoat comprising a platinum group metal which extends from the outlet end of the passages and for a length in the range of greater than about 10% to about 50% of the wall length.

BRIEF DESCRIPTION OF THE DRAWINGS

Further features of embodiments of the present invention, their nature and various advantages will become more apparent upon consideration of the following detailed description, taken in conjunction with the accompanying drawings, which are also illustrative of the best mode contemplated by the applicants, and in which like reference characters refer to like parts throughout, where.

DETAILED DESCRIPTION OF THE INVENTION

Before describing several exemplary embodiments of the invention, it is to be understood that the invention is not limited to the details of construction or process steps set forth in the following description. The invention is capable of other embodiments and of being practiced or being carried out in various ways.

Reference throughout this specification to "one embodiment," "certain embodiments," "various embodiments," "one or more embodiments" or "an embodiment" means that a particular feature, structure, material, or characteristic described in connection with the embodiment may be included in at least one embodiment of the invention. Thus, the appearances of the phrases such as "in one or more embodiments," "in certain embodiments," "in various embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

In various embodiments, the coated filter substrates disclosed herein are described as being "zoned," e.g., "multi-zoned." These terms are understood as describing substrates wherein at least two different catalyst compositions are disposed in certain regions (zones), e.g., along the length of the substrate. A plurality of zones is generally formed by a plurality of coatings, wherein the catalytic coatings may be on the surface of the porous walls of the substrate and/or within pores of the porous walls of the substrate. Such zones can be independently modified to provide one or more specific catalytic functions within each zone. An exhaust gas stream, passing from the inlet end to the outlet end of a coated substrate encounters different catalytic compositions (e.g., layers) or different combinations of catalytic compositions as it passes from one zone of the coated substrate to another. A "first" zone is usually that zone closest to the inlet of the substrate, with additional zones (e.g., second, third, etc.) downstream thereof.

As used herein, the term "permeate" when used to describe the dispersion of the SCR catalyst and/or oxidation catalyst into the porous walls of the filter substrate, means that the particular composition penetrates into at least a majority of the hollow regions within the wall thickness, and becomes deposited on the internal surfaces throughout the thickness of the walls. In this manner the material becomes dispersed throughout the wall of the filter.

As used herein, the term "local loading" when used to describe the amount of catalytic material (e.g., PGM, SCR catalyst, or oxidation catalyst) present in or on the porous walls, means the average amount of catalytic material deposited on the walls within a particular zone or zones, i.e., the indicated loading is not averaged over the entire length of the substrate.

As used herein, "catalytic material loading" refers to a weight of material comprising one or more catalytically active component(s) deposited on and/or into the walls of a catalytic article, where the catalytically active components may be a platinum group metal (e.g., Pt, Pd, Rh), and/or a transition metal (e.g., Cu, Fe, Co, Ni, La, V, Mo, W, Mn, Ce, Ag). The catalytic material may further comprise a support material onto which the catalytically active component(s) are dispersed, and/or into which the catalytically active component(s) are impregnated, wherein the support material may be alumina, titania, zirconia, silica, silica/alumina, or a combination thereof.

As used herein, a washcoat loading is defined in $g/in^3$, as the total weight of all washcoat components (i.e., PGM, refractory metal oxide support, zeolite, base metals, OSC, etc.) per unit volume of the monolithic substrate. PGM loading is defined in $g/ft^3$, as the total weight of all PGM metals in the catalyst (e.g., Pt+Pd+Rh) per unit volume of the monolithic substrate. Therefore, TWC, DOC, CSF and LNT catalysts that use PGMs may be uniquely described with both washcoat loading and PGM loading, while SCR catalysts that do not have a PGM component may be described by only the washcoat loading. AMOx catalysts that have both SCR catalytic material and PGMs may be described by both criteria. As used herein, "loading" for a PGM catalyst is the actual weight of PGM affixed to the internal and external surfaces of the porous wall(s) of a filter substrate after the wash coat is applied, whereas "loading" for SCR catalytic material is the actual combined weight of metal promotor and molecular sieve material affixed to the internal and external surfaces of the porous wall(s) of a filter substrate after the wash coat is applied. In addition, a localized PGM or washcoat loading may be used to specifically describe the weight/volume of catalyst components in a specific catalyst zone.

In one or more embodiments, a PGM end coating covers the outlet end surface and outlet end face of outlet plugs of a wall flow filter. As used herein, "platinum group metal" (PGM) refers to platinum, palladium, rhodium, ruthenium, osmium, and iridium, or combinations thereof, and their oxides.

In one or more embodiments, the PGM end coating extends a distance less than 1.5 times the depth of the outlet plugs from the outlet end surface. Depth as used herein is the distance into which the outlet plugs protrude into the passages of the substrate (filter), i.e., the distance from the outlet end face of the outlet plug to the opposing end of the outlet plug (within the filter). According to one or more embodiments, the outlet plugs have a depth in the range of 3 mm to 8 mm, and can include depths of 3 mm, 4 mm, 5 mm, 6 mm, 7 mm, and 8 mm. In one or more embodiments, the PGM end coating is present at a local loading in the range of about 20 to about 200 $g/ft^3$. In one or more embodiments, the platinum group metal end coating is present at a local loading in the range of about 25 to about 200 $g/ft^3$, about 30 to about 200 $g/ft^3$, about 35 to about 200 $g/ft^3$, about 40 to about 200 $g/ft^3$, about 45 to about 200 $g/ft^3$, or about 50 to about 200 $g/ft^3$.

According to one or more embodiments, when such a PGM end coating is on a wall flow filter, the filter is also catalyzed with a selective catalytic reduction (SCR) catalyst. In one or more embodiments, precise application of the PGM end coating by an applicator to apply a paste of the PGM coating limits or prevents the coating from extending axially from the outlet end along the porous walls of the wall flow filter. Therefore, overlap and/or contact between the SCR catalyst composition and the PGM end coating are avoided, and negative interactions between the SCR catalyst composition and PGM catalyst composition are avoided. In one or more embodiments, the PGM end coating is end face applied by an applicator to only the outlet end surface and the outlet end face of the plugs. In specific embodiments, the applicator can be a brush, a roller, a squeegee, or a stamp pad. In highly specific embodiments, the applicator is a roller applicator. Suitable roller applicators can have a construction similar to rollers used in painting.

According to one or more embodiments, the roller applicator can include a cylindrical core with a pile fabric covering secured to the cylindrical core. Alternatively, the roller applicator cylindrical core can be constructed of foam rubber. It will be appreciated that the roller can be used to transfer material (i.e., PGM catalyst composition) from the roller to the end face of the wall flow filter. For rollers including a cylindrical core with a pile fabric, nap length of the pile fabric can determine the depth to which the PGM coating will extend from the outlet end face axially along the wall of the filter. As will be appreciated, a longer nap length pile fabric on the roller will result in the platinum group metal coating extending deeper into the wall flow filter. Similarly, if a foam rubber roller is used, a softer foam rubber may allow the coating to penetrate deeper into the wall from the outlet end by applying higher pressure to the roller as the platinum group metal is applied to the outlet end of the filter.

Another way in which the extent of the depth of the PGM end coating extends axially into the filter from the outlet end face can be varied is by modifying the viscosity of the PGM end coating when it is applied to the outlet end of the filter. Generally, to minimize or prevent the PGM end coating from penetrating the porous filter walls by capillary action, a PGM coating should have a relatively high viscosity, e.g., as compared to a slurry that is used to apply a washcoat by dip coating. A viscosity of a paste is desirable to minimize or eliminate capillary travel of the PGM end coating in the porous walls of the filter.

In one or more embodiments, the SCR catalyst and/or other catalytic materials (e.g., an oxidation catalyst) contained within the filter, as described in greater detail below, may remain essentially on the surface of the porous filter walls. As used herein, the term "essentially on the surface" when used to describe the dispersion of the SCR catalyst and/or oxidation catalyst on the porous walls, means that at least a majority of the catalyst particles of the particular composition do not penetrate into regions within the wall thickness and become deposited on the internal surfaces throughout the thickness of the walls. Instead, the catalytic material becomes deposited on the outer surfaces of the walls, and a minority of the catalyst particles penetrates no further than about 50% into hollow regions within the wall thickness, or no further than about 33% into hollow regions within the wall thickness, or no further than about 10% into hollow regions within the wall thickness. In one or more embodiments, the penetration depth may be varied to optimize filter backpressure and interaction with catalyst components applied in separate washcoating steps, wherein the penetration depth of the SCR catalyst and/or oxidation catalyst may be in the range of about 5% to about 50% of the porous wall thickness, or in the range of about 10% to about 40%, or in the range of about 5% to about 20%, or in the range of about 20% to about 35%.

The problem of balancing the several competing reactions may be addressed by the judicious selection and arrangement of catalytic materials and components in the exhaust stream, where the particulate matter (PM) can be reduced by the use of a porous wall particulate filter, oxides of nitrogen ($NO_x$) can be reduced with a selective catalytic reduction (SCR) catalyst utilizing a reductant (e.g., urea, $NH_3$), and ammonia slip can be reduced by an ammonia oxidation catalyst (AMOx) that can optionally be included in the systems disclosed herein. Certain principles and embodiments of the present invention relate generally to multi-zone catalyzed filter articles, methods of manufacturing multi-zone catalyzed filter articles, and methods for controlling emissions in gasoline and diesel engine exhaust streams with multi-zone catalyzed filter articles, where the emission treatment system of various embodiments effectively treats diesel engine exhaust with a single multi-zone catalyzed filter article.

In order to remove soot, multi-zone catalyzed filter articles have high filtration capabilities. For catalyst coatings on a filter, two important considerations are backpressure minimization and prevention of bypass of the exhaust around the catalyst disposed in/on the filter. The minimization of back pressure translates directly into fuel savings and potentially engine life as well. For a multi-zone catalyzed filter article that uses separate SCR and oxidation catalyst materials to remove $NO_x$ by $NH_3$, and CO and HC by $O_2$, the exhaust first passes through the SCR catalyst (i.e., as a "first zone") and then passes across the oxidation catalyst (i.e., as a "second zone"). If the exhaust bypasses the SCR catalyst and first is exposed to the oxidation function, then the reductant (e.g. $NH_3$) will be oxidized to $NO_x$ and the $NO_x$ abatement function will be compromised, even to the point of emitting greater $NO_x$ than the amount that entered the catalyst before the $NH_3$ is added as the reductant.

As disclosed herein, integration of $NO_x$ reduction and particulate removal functions into a single catalyst article is accomplished using a wall flow substrate coated with an SCR catalyst composition. In particular, a unique method is described herein for applying an SCR catalyst composition to a wall flow substrate to form a substrate that can be used in an application where high filtration efficiency is required. For instance, a substrate formed with this method is suitable for effectively removing particulate matter (e.g., greater than 80%, or 90%, or 99%) from an exhaust gas in the emission treatment system of an embodiment of the invention. The coating method disclosed herein allows wall flow substrates to be loaded with practical levels of SCR catalyst without causing excessive back pressure across the coated article when implemented in emission treatment systems. In one or more embodiments, the SCR catalyst is disposed throughout the wall of the filter along the entire length and permeates the whole cross-section of the wall. This allows for the SCR catalyst to permeate all filter pores and to spread over the maximum filter volume, thereby minimizing backpressure, and ensuring no by-passing of the SCR catalyst.

In one or more embodiments, in addition to an end coating of platinum group metal, a washcoat of oxidation catalyst is dispersed throughout the wall of the filter along at least a portion of the length of the filter and permeates the whole cross-section of the wall. This allows the oxidation catalyst to permeate the filter pores and to spread over the maximum filter volume, thereby minimizing backpressure, and ensuring no by-passing of the oxidation catalyst.

In one or more embodiments, the oxidation catalyst is dispersed throughout the wall of the filter along at least a portion of the length of the filter, where the oxidation catalyst permeates the whole cross-section of the wall, and the oxidation catalyst is dispersed on the surface of the wall of the filter along at least a portion of the length of the filter where the oxidation catalyst does not permeate the whole cross-section of the wall. This allows the majority of the oxidation catalyst to reside primarily on the filter surface, and a minority of the catalyst particles penetrate no further than about 50% into the wall thickness, or no further than about 33% into the wall thickness, or no further than about 10% into the wall thickness, along a portion of the filter wall length.

In various embodiments, different zones of the catalyzed filters disclosed herein are distinguished from each other by a change in the composition of the catalytic coating, a change in the loading of the catalytic coating, or both, when observed axially along the length of a porous wall of the filter.

In one or more embodiments, the oxidation catalyst (as a "second zone") is dispersed on top of the wall of the outlet channel(s). In various embodiments, the oxidation catalyst forms a layer on top of the wall over the SCR catalyst dispersed throughout the wall (as a "first zone"). The oxidative catalyst allows for some gas passage across the wall directly underneath it, providing that there is sufficient SCR catalyst in the wall to remove $NO_x$ prior to the gas crossing the oxidation catalyst.

One or more embodiments of the invention are directed to catalyzed particulate filters comprising a plurality of longitudinally extending passages formed by longitudinally extending porous walls bounding and defining the passages and an axial length extending between an inlet end and an outlet end. The passages comprise inlet passages, which are open at the inlet end and closed at the outlet end, and outlet passages, which are closed at the inlet end and open at the outlet end. As used herein, the terms "inlet end" and "outlet end" are in reference to the intended and accepted path of an exhaust gas through a catalytic article, where an untreated exhaust gas passes into a catalytic article at an inlet end, and a treated exhaust gas exits from an outlet end of the catalytic article. In various embodiments, the outlet end of the catalytic article is opposite the inlet end.

In various embodiments, an SCR catalyst composition may be disposed within the porous walls of the wall flow filter and/or on the walls of the inlet passages extending from the inlet end and less than the full axial length of the wall flow filter, wherein the SCR catalyst composition comprises a molecular sieve and a transition metal, and an oxidation catalyst comprising a PGM is disposed within the porous walls of the wall flow filter and/or on the walls of the outlet passages extending from the outlet end and less than the full axial length of the wall flow filter. In one or more embodiments, a portion of the oxidation catalyst can permeate into the filter walls and be intermixed with the SCR catalyst. In some embodiments the catalyst applied to the inlet or outlet channels may form a thin washcoat layer over the inlet or outlet plugs, within the inlet or outlet channels.

Principles and embodiments of the present invention relate to a catalyzed particulate filter comprising a substrate having porous walls and at least three catalytic zones along the length of the porous walls, where each of the at least three catalytic zones may comprise a first SCR catalyst, an oxidation catalyst (e.g., a PGM catalyst), and a second SCR catalyst.

Principles and embodiments of the present invention also relate generally to a method of abating exhaust gas from a lean burn engine, wherein the exhaust gas is flowed through an embodiment of a catalyzed particulate filter as described herein, wherein at least five of CO, HC, $NO_x$, soot, $NH_3$ and $H_2S$, and preferably all six of CO, HC, $NO_x$, soot, $NH_3$ and $H_2S$ are partially removed from the exhaust gas by the catalyzed particulate filter. Principles and embodiments of the present invention also relate generally to the integration of $NO_x$ reduction and particulate removal functions into a single catalyst article that is accomplished using a wall flow substrate coated with an SCR catalyst composition.

Particulate Filter

In one or more embodiments, the particulate filter comprises a plurality of porous walls having a length extending longitudinally to form a plurality of parallel passages extending from an inlet end to an outlet end, wherein a quantity of the passages are inlet passages that are open at the inlet end and closed at the outlet end, and a quantity of passages different from the inlet passages are outlet passages that are closed at the inlet end and open at the outlet end. In various embodiments, the passages are closed with a plug, wherein the plug may have a length of about ¼" long (and a corresponding "depth" when described in conjunction with the filter). The open frontal area may comprise 50% to 85% of the surface area, and the cell wall thickness may be from 4 to 20 mils, where 1 mil is 0.001 inches. In one or more embodiments, the particulate filter has an inlet end into which gases may enter the inlet passages, and an outlet end from which gases may exit the outlet passages, where the gases pass from an inlet passage to an outlet passage by moving through the porous walls forming the parallel passages.

In one or more embodiments, the porous walls have a porosity in the range of about 40% to about 75%, about 40% to about 60%, about 50% to about 70%, about 50% to about 65%, about 60% to about 70%, or about 55% to about 65%. In various embodiments the porous walls have a porosity in the range of about 60% to about 65%. In one or more embodiments, the mean pore size of the porous walls is in the range of about 10 µm to about 30 µm, about 10 µm to about 25 µm, or about 20 µm to about 25 µm. In various embodiments, the mean pore size of the porous walls is in the range of about 15 µm to about 25 µm.

In various embodiments, reference to a coating "extending from" an inlet end or an outlet end indicates that the coating starts at one end of the wall and progresses along the wall length towards the opposite end, or where a feature of the coating, such as being on the surface, may start a distance from the actual inlet opening, reference to the coating feature "extending from" an inlet end or an outlet end indicates the coating feature progresses along the wall length towards the opposite end. For example, a second zone between a first and third zone may include a coating on the surface that extends a percentage of the wall length from the inlet or outlet end, but does not start at the inlet or outlet end, and can indicate the direction that the coating extends.

Selective Catalytic Reduction (SCR) Catalyst

In one or more embodiments, the SCR catalyst comprises a molecular sieve. In various embodiments, the molecular sieve may have a zeolitic framework, and the zeolitic framework may have ring sizes no larger than 12. In one or more embodiments, the zeolitic framework material comprises a double-six ring (d6r) unit. In one or more embodiments, the zeolitic framework material may be selected from AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof. In various embodiments, the zeolitic framework material may be selected from AEI, CHA, AFX, ERI, KFI, LEV, and combinations thereof. In various embodiments, the zeolitic framework material may be selected from AEI, CHA, and AFX. In various embodiments, the zeolitic framework material is CHA.

In one or more embodiments, the SCR catalyst further comprises a metal, which may be a base metal. In various embodiments, the SCR catalyst is promoted with a metal selected from Cu, Fe, Co, Ni, La, Ce, Mn, V, Ag, and combinations thereof. In various embodiments, the SCR catalyst is promoted with a metal selected from Cu, Fe, Ag, and combinations thereof. In various embodiments, the selective catalytic reduction catalyst is promoted with Cu and/or Fe.

In one or more embodiments, the zeolitic framework material is CHA promoted with copper or iron. In one or more embodiments, the copper or iron promoted CHA structure type molecular sieve may be mixed with a plurality of platinum group metal impregnated alumina and/or silica/alumina particles to form a slurry.

In one or more embodiments, the SCR catalyst may be at a first loading (e.g., in a zone at the inlet) and optionally at a second loading (e.g., wherein the SCR catalyst is mixed with the PGM and/or in a zone at the outlet), wherein the first loading may be in the range of about 0.5 g/in$^3$ to about 3 g/in$^3$, and the second loading may be in the range of about 0.5 g/in$^3$ to about 2.5 g/in$^3$, where the second loading may be the same or different from the first loading. In various embodiments, the potential loading in an overlapping zone may be in the range of about 1.0 g/in$^3$ to about 5.0 g/in$^3$.

A non-limiting example of an SCR catalyst is a CHA zeolitic framework material promoted with copper having a silica to alumina molar ratio in the range of about 10 to about 100, more specifically, about 10 to about 75, and even more specifically about 10 to about 60. In various embodiments, at least about 0.5 g/in$^3$ of an SCR composition, and in particular, about 1.0 to about 2.0 g/in$^3$, may be disposed on the porous walls of the filter. In various embodiments, the first loading of an SCR catalyst in the second catalytic zone may be in the range of about 0.5 g/in$^3$ to about 2 Win'.

Oxidation Catalyst

Principles and embodiments of the present invention relate to an oxidation catalyst comprising a PGM disposed on/in at least one zone of the catalyzed particulate filter. In one or more embodiments, the PGM of the oxidation catalyst may be selected from platinum, palladium, rhodium, ruthenium, osmium, and iridium, or combinations thereof. In various embodiments, the PGM of the oxidation catalyst may be selected from platinum, palladium, or combinations thereof.

In one or more embodiments, the oxidation catalyst comprises at least one platinum group metal on a plurality of particles, and the plurality of particles of the oxidation catalyst may have a composition of alumina, titania, zirconia, silica, silica/alumina, or a combination thereof. In one or more embodiments, the PGM may be impregnated into the alumina, titania, zirconia, silica, and/or silica/alumina particles by an incipient wetness technique followed by a thermal treatment between 400° C. and 600° C. In various embodiments, the loading of PGM onto the length of porous wall permeated with oxidation catalyst slurry is in the range of about 0.1 g/ft$^3$ to about 50 g/ft$^3$. In various embodiments, the loading of PGM onto the length of porous wall permeated with the slurry is in the range of about 0.1 g/ft$^3$ to about 50 g/ft$^3$, or in the range of about 1 g/ft$^3$ to about 50 g/ft$^3$. In one or more embodiments, the PGM loading in the second catalytic zone may be in the range of about 0.1 g/ft$^3$ to about 50 g/ft$^3$, or in the range of about 1 g/ft$^3$ to about 50 g/ft$^3$.

In one or more embodiments, the oxidation catalyst is a PGM slurry having a D90<3 microns, or a D90<5 microns, or a D90<10 microns, or D90≈5-7 microns. In various embodiments, a copper or iron promoted CHA structure type molecular sieve may be mixed with the oxidation catalyst slurry.

PGM End Coating

In one or more embodiments, a platinum group metal end coating may be provided, covering the outlet end surface and the outlet end face of the wall flow filter plugs, the coating extending a distance less than 1.5 times the length of the outlet plugs form the outlet end surface and having a platinum group metal local loading in the range of 20 to 200 g/ft$^3$. In one or more embodiments, the platinum group metal end coating is applied by face-painting the PGM using an applicator to transfer the coating to only the outlet end surface and the outlet end face of the plugs. According to one or more embodiments, the applicator is selected from a brush, a roller, a squeegee, and a stamp pad. According to one or more embodiments, the PGM end coating is applied as a coating that has a viscosity that is higher than a traditional slurry that is used to apply a washcoat. In one or more embodiments, the PGM end coating when applied has the consistency of a paste with a viscosity that prevents the coating from travelling in an axial direction along the porous walls of the filter.

Manufacturing Methods

Principles and embodiments of the present invention also relate to a method of manufacturing a catalyzed particulate filter article having at least two catalytic zones or at least three catalytic zones, wherein the catalytic zones are formed using at least two or at least three catalytic coatings, respectively.

In one or more embodiments, an oxidation catalyst may be introduced into an outlet end of a plurality of parallel passages formed by a plurality of porous walls closed by a plug on an inlet end opposite the outlet end, wherein the particles of the oxidation catalyst permeate through the porous walls, and wherein the length of porous wall permeated with the oxidation catalyst is in the range of about 10% to about 80%, about 10% to about 70%, or about 60% to about 70% of the wall length extending from the outlet end of the passages.

In one or more embodiments, a, SCR catalyst comprising a plurality of particles may be introduced into an inlet end of a plurality of parallel passages formed by a plurality of porous walls closed by a plug on an outlet side opposite the inlet side, wherein the particles of the SCR catalyst permeate through the porous walls, wherein the length of porous wall permeated with the particles of the SCR catalyst is in the range of about 20% to about 100%, about 50% to about 100%, about 50% to about 80%, or about 60% to about 70% of the wall length extending from the inlet end of the passages.

In various embodiments, the oxidation catalyst may comprise a plurality of particles, for example, as a slurry of inorganic support material coated and/or impregnated with a PGM, wherein the oxidation catalyst may be an ammonia oxidation catalyst.

In one or more embodiments, the oxidation catalyst is introduced into the outlet end of the plurality of parallel passages before the SCR catalyst is introduced into the inlet end of the plurality of parallel passages. In various embodiments, the SCR catalyst is introduced into the inlet end of the plurality of parallel passages before the oxidation catalyst is introduced into the outlet end of the plurality of parallel passages.

In one or more embodiments, the particles of the oxidation catalyst are interspersed with the particles of the SCR catalyst within at least a portion of the plurality of porous walls, wherein the particles of the SCR catalyst and the oxidation catalyst are interspersed on the surfaces and/or within the void space of the porous walls. As such, in some embodiments, a substrate is provided which comprises a zone comprising only SCR catalyst and a zone comprising SCR catalyst and oxidation catalyst (e.g., PGM metal), interspersed on/within the porous walls. In various embodiments, the porosity of the porous walls is in the range of about 60% to about 65%.

In one or more embodiments, a PGM end coating may be placed on the exterior surface of a plug on the outlet side of the parallel passages. In various embodiments, the PGM end coating may be coated onto the surfaces of the porous walls in the range of about 5%, or no more than about 5%, no more than about 3%, no more than about 2%, or no more than about 1% of the wall length extending from the outlet end of the outlet passages, or no more than double the length of the outlet plug.

In a non-limiting example of a process to coat the wall flow substrates with the SCR catalyst composition and/or oxidation catalyst, the substrate may be immersed vertically in a portion of a catalyst slurry of solid particles in a liquid such that the top of the substrate is located just above the surface of the slurry. The sample is left in the slurry for about 30 seconds. The substrate is removed from the slurry, and excess slurry is removed from the wall flow substrate first by allowing it to drain from the channels, then by blowing with compressed air (against the direction of slurry penetration). Depending upon the pore size of the filter, the mean particle size of the SCR catalyst slurry, and prior processing steps, the SCR catalyst slurry may be deposited on and/or permeate into the porous walls of the filter, such that the pores are not occluded to the extent that undue back pressure will build up in the finished substrate. In various embodiments, the oxidation catalyst slurry may be deposited on and/or permeate into the porous walls of the filter.

In various embodiments, a second SCR catalyst may be applied to either the inlet or outlet channels to deposit on and/or permeate into the porous walls of the filter. In various embodiments, a second oxidation catalyst may be applied to the inlet and/or outlet channels to deposit on the surface of the porous walls of the filter.

In one or more embodiments, a method of making a catalyzed soot filter comprises coating the catalyzed soot filter including a plurality of porous walls extending longitudinally to form a plurality of parallel passages extending from an inlet end to an outlet end, wherein a quantity of the passages are inlet passages that are open at the inlet end and closed with an outlet plug at the outlet end, and a quantity of passages are outlet passages that are closed with an inlet plug at the inlet end and open at the outlet end, the outlet plug having a depth and an outlet plug end face, the outlet end defining an outlet end surface including the outlet plug end face. Coating the catalyzed soot filter includes washcoating an SCR catalyst washcoat on the porous walls of the particulate filter and contacting the outlet plug end face and outlet end surface with an applicator containing a PGM coating so that the PGM coating is transferred from the applicator to the outlet plug end faces and outlet end surfaces. The SCR washcoat can be applied first, and the platinum group metal coating applied by the applicator can be applied second. Alternatively, the order of applying the coatings can be reversed.

In one or more embodiments, the PGM end coating extends a distance less than 1.5 times the depth of the outlet plugs from the outlet end surface. In one or more embodiments, the PGM end coating extends a distance equal to or less than the depth of the outlet plugs. In one or more embodiments, the PGM end coating has a viscosity which prevents the coating from travelling along the axial length of the porous walls when the PGM end coating is transferred from the applicator to the outlet plug end faces and outlet end surfaces of the porous walls. In one or more embodiments, the applicator is selected from the group consisting of a brush, a roller, a squeegee, and a stamp pad. In one or more embodiments, the method can also include washcoating a PGM washcoat which extends from the outlet end of the passages and for a length in the range of greater than about 10% to about 50% of the wall length.

Catalytic Exhaust System and Methods of Reducing Emissions

Principles and embodiments of the present invention also relate to catalytic exhaust systems incorporating at least one catalyzed particulate filter, as described herein. In various embodiments, the catalytic exhaust system may comprise a catalyzed particulate filter according to the present disclosure and one or more additional components for reducing a plurality of gaseous pollutants and some proportion of the particulate matter.

In one or more embodiments, a urea injector, also referred to as a reductant dosing system, may be provided upstream of the catalyzed particulate filter to inject a $NO_x$ reductant into the exhaust stream to facilitate operation of an SCR catalyst incorporated into the catalyzed particulate filter. As disclosed in U.S. Pat. No. 4,963,332, which is hereby incorporated by reference in its entirety for all purposes, $NO_x$ upstream and downstream of the catalytic converter can be sensed, and a pulsed dosing valve can be controlled by the upstream and/or downstream signals. In alternative configurations, as in the systems disclosed in U.S. Pat. No. 5,522,218, which is hereby incorporated by reference in its entirety for all purposes, the pulse width of the reductant injector may be controlled from sensor values and/or maps of exhaust gas temperature and engine operating conditions such as engine rpm, transmission gear and engine speed. Reductant pulse metering systems can also be employed, as described, e.g., in U.S. Pat. No. 6,415,602, the discussion of which is hereby incorporated by reference in its entirety for all purposes.

In various embodiments, the exhaust system may comprise an exhaust manifold, an exhaust pipe (or a down pipe, or a Y-pipe), a muffler, and a tailpipe. A catalytic exhaust system may be inserted into the exhaust system at the Y-pipe and/or exhaust pipe to treat the exhaust gas from the internal combustion engine prior to the gases exiting the tailpipe to the atmosphere.

In one or more embodiment, the catalytic exhaust system comprises a monolithic catalytic substrate having a length, a width, a height, and a precious metal loading. In various embodiments, the monolithic catalytic substrate has a shape that may be cylindrical, having a diameter that defines a cross-sectional area, and a length; elliptical, having a major axis and a minor axis that defines a cross-sectional area, and a length; or oblong, having a chief axis and a transverse diameter that defines a cross-sectional area, and a length, and wherein the monolithic catalytic substrate has a precious metal loading to provide an intended level of catalytic activity. In one or more embodiments, the precious metal loading may comprise one or more platinum group metals, one or more base metals, one or more precious and/or base metal oxides, or a combination thereof.

In various embodiments, the catalytic exhaust system may comprise two-way catalysts, three-way catalysts (TWC) (used primarily on stoichiometric-burning gasoline engines), diesel oxidation catalysts (DOC) (used primarily on lean-burning diesel engines), selective catalytic reduction (SCR) catalysts, lean nitrous oxide catalysts (LNC), ammonia slip catalysts (ASC), ammonia oxidation catalysts (AMOx), $NO_x$ absorbers also called $NO_x$ storage/release catalysts (NSR) and lean $NO_x$ trap (LNT), diesel particulate filters (DPF), gasoline particulate filters (GPF), partial oxidation catalysts (POC), and catalyzed soot filters (CSF), as well as combinations thereof. In various embodiments, the catalytic exhaust system may include one or more additional components selected from (but not limited to) a Diesel Oxidation Catalyst (DOC), Lean $NO_x$ trap (LNT), Passive $NO_x$ Absorber (PNA), SCR catalyst with associated ammonia injection, and Ammonia Oxidation catalyst (AMOx).

In various embodiments, a monolithic catalytic substrate may be coated with at least one washcoat layer containing one or more catalytic materials that may be selected from the platinum group metals, base metals, and metal oxides, and the substrate housed within a shell. In one or more embodiments, the catalytic converter may comprise a monolithic catalytic substrate encased within a shell having an inlet and an outlet, wherein the shell may be housed within a housing that may be operatively associated and in fluid communication with an exhaust system of an internal combustion engine.

Figure 1:
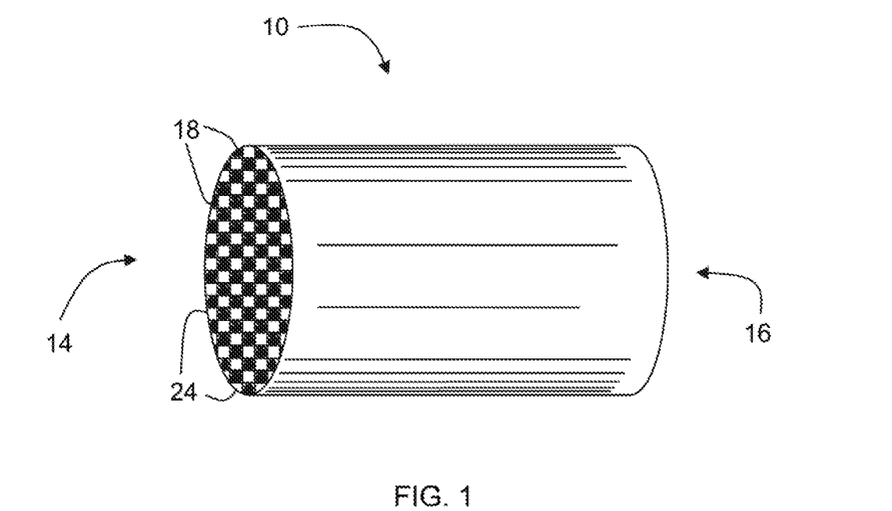
FIG. 1 illustrates an external view of an embodiment of a wall flow filter substrate having an inlet end and an outlet end.
Figure 2:
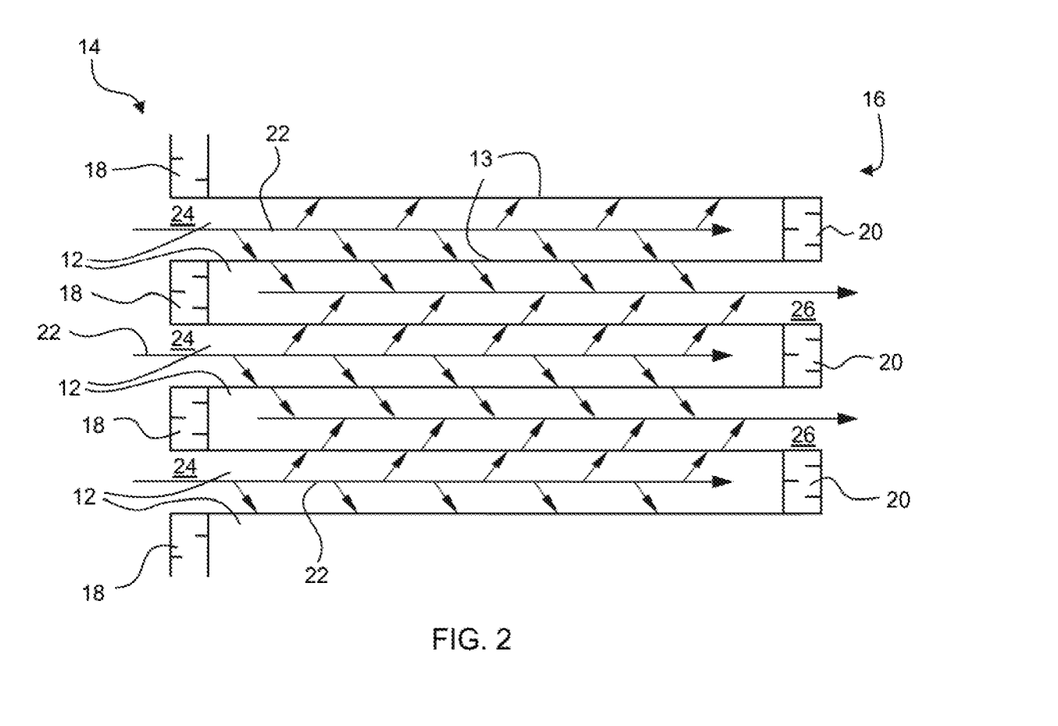
FIG. 2 illustrates a cross-sectional view of an exemplary embodiment of a plurality of porous walls extending longitudinally from an inlet end to an outlet end of a wall flow filter substrate.

FIGS. 1 and 2 illustrate a typical wall flow filter substrate 10 (also referred to as a wall flow filter) which has a plurality of passages 12. The passages are formed and tubularly enclosed by the internal walls 13 of the filter substrate. FIG. 1 depicts an external view of an embodiment of a wall flow filter substrate having an inlet end 14 and an outlet end 16. Alternate passages are plugged at the inlet end with inlet plugs 18 (shown in black), and at the outlet end with outlet plugs 20 to form opposing checkerboard patterns at the inlet end 14 and outlet end 16 of the substrate.

FIG. 2 illustrates a cross-sectional view of an embodiment of a plurality of porous walls extending longitudinally from an inlet end to an outlet end of a wall flow filter substrate. A partial cross-sectional view of an embodiment of a plurality of porous walls 13 extending longitudinally from an inlet end 14 to an outlet end 16, and forming a plurality of parallel passages 12 is shown. A gas stream 22 (shown as arrows) enters through the open, unplugged end of inlet passages 24, is stopped at the closed end by outlet plug 20, and diffuses through the porous walls 13 forming the passages to the outlet passages 26. The gas stream 22 exits the filter by flowing through the open, unplugged end of outlet passages 26, and is stopped at the closed end by inlet plug 18. The gas is prevented from flowing backwards to the inlet end of the filter from the outlet passages by the inlet plugs 18, and prevented from re-entering the inlet passages from the outlet end by the outlet plugs 20. In this manner, a quantity of the passages are inlet passages that are open at the inlet end and closed at the outlet end, and a quantity of passages are outlet passages that are closed at the inlet end and open at the outlet end, where the outlet passages are different passages than the inlet passages.

Figure 3:
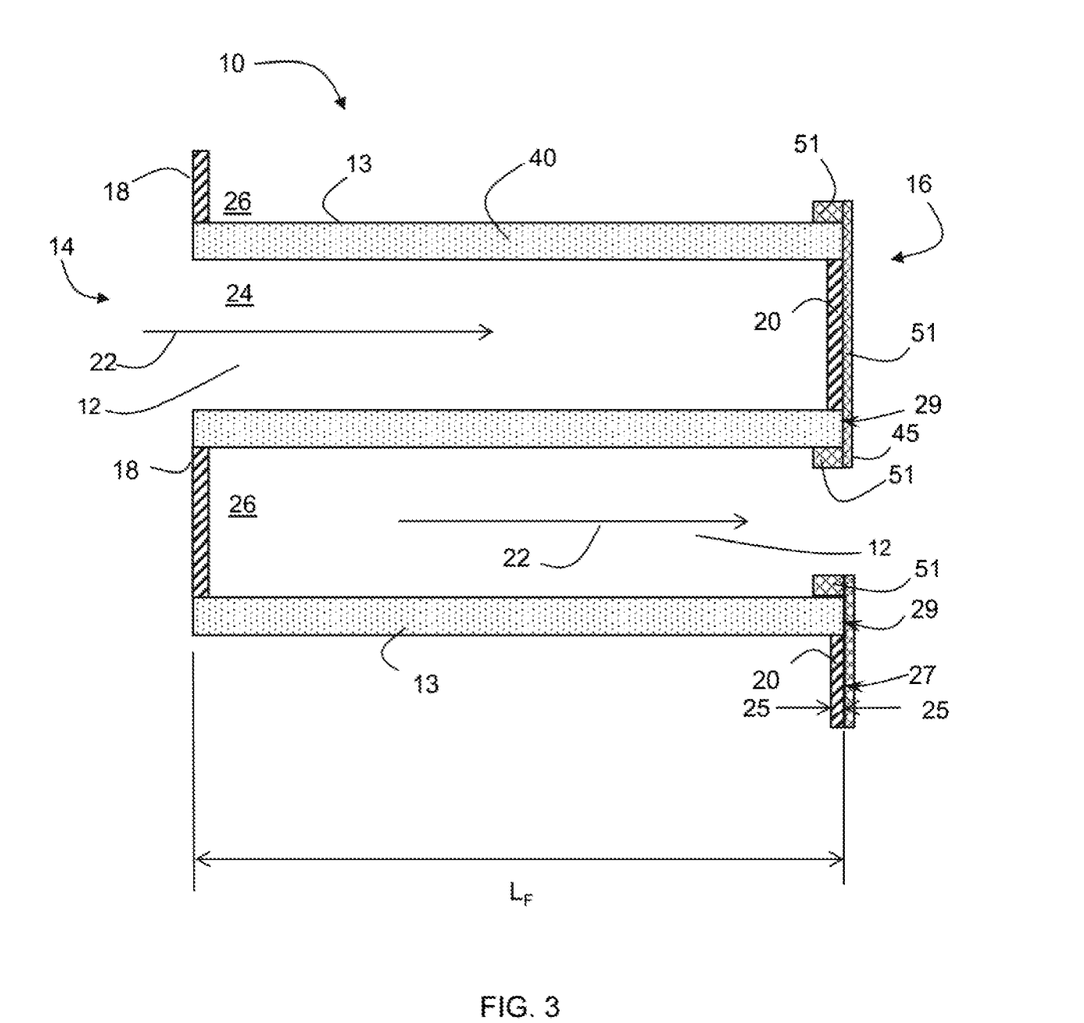
FIG. 3 illustrates a magnified view of a cross-section of another exemplary embodiment of a plurality of porous walls of a wall flow filter substrate having a plurality of zones formed by a plurality of coatings.

FIG. 3 illustrates a magnified view of a cross-section of an exemplary embodiment of a plurality of porous walls of a wall flow filter substrate having a plurality of zones. The catalyst article shown comprises a wall flow filter 10 having a plurality of longitudinally extending passages 12 formed by longitudinally extending porous walls 13 bounding and defining the passages 24 and 26, where the walls have an axial length extending between an inlet end 14 and an outlet end 16 of the wall flow filter having a length '$L_F$'. In various embodiments, the porous walls have substantially uniform porosity throughout. The passages 24 and 26 comprise inlet passages 24 which are open at the inlet end 14 and closed at the outlet end 16, and outlet passages 26 which are closed at the inlet end 14 and open at the outlet end 16. In various embodiments, the outlet plugs 20 have a depth as shown between arrows 25 and an outlet plug end face 27. The outlet end 16 of the walls 13 defines an outlet end surface 29.

Figure 4:
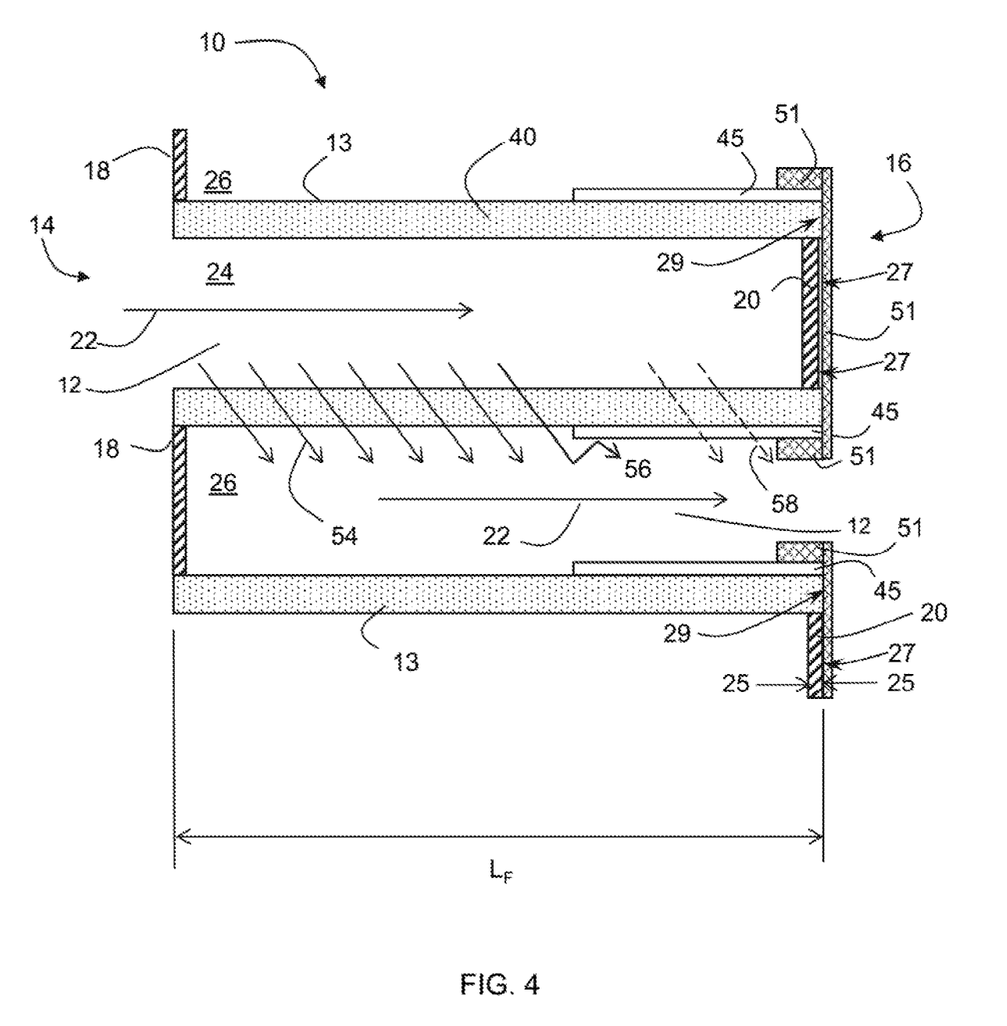
FIG. 4 illustrates a magnified view of a cross-section of another exemplary embodiment of a plurality of porous walls of a wall flow filter substrate having a plurality of zones formed by a plurality of coatings.

FIG. 4 illustrates a magnified view of a cross-section of another exemplary embodiment of a plurality of porous walls of a wall flow filter substrate having a catalyst at least on the surface of the walls of a front zone. In one or more embodiments, an exhaust gas stream 22 enters the inlet passages 24 and flows toward the outlet end 16 of the wall flow filter 10. The gas can take multiple paths 54, 56, and/or 58 through the filter 10, including passing through 54 the porous walls 13 from the inlet passages 24 to the outlet passages 26, where it can exit the via the outlet end 16 of the filter. In another flow pathway 56, some of the exhaust gas 22 can follow pathway 54 through the porous filter wall 13 containing the SCR catalyst 40 and then contact the oxidation catalyst 45 as it exits the filter. For another alternative pathway 58, some of the exhaust gas 22 can diffuse through the porous wall 13 containing the SCR catalyst 40 and through the oxidation catalyst 45.

In various embodiments, the depth of the inlet plugs 18 and/or outlet plugs 20 is in the range of about 3 mm to about 8 mm, or in the range of about 6 mm to about 7 mm, or about 6.35 mm (0.25 inches). In various embodiments, the inlet plugs 18 and/or outlet plugs 20 extend their full length into the inlet passages 24 and/or the outlet passages 26 respectively, wherein the exterior surface of the plugs 18 and 20 are essentially flush with the ends of the porous walls 13 of the wall flow filter 10.

In one or more embodiments, a PGM end coating 51 may be coated onto outlet end surface 29 and the outlet plug end face 27 of the plugs. In one or more embodiments, the PGM end coating 51 may extend into the outlet end of the outlet passages 26 about 5% or less of the wall length, about 3% or less of the wall length, or 1% or less of the wall length. In various embodiments, the PGM end coating 51 may extend into the outlet end of the outlet passages 26 a length in the range of about 1 mm to about 2.5 mm. In various embodiments, the PGM end coating 51 may extend into the outlet end of the outlet passages 26 a length of about 1.5 times the depth of the outlet plug or about one times the depth of the outlet plug.

FIG. 3 illustrates a magnified view of a cross-section of another exemplary embodiment of a plurality of porous walls of a wall flow filter substrate having a plurality of zones formed by a plurality of coatings, wherein at least some catalytic coatings may be on the surface of the porous walls of the wall flow filter. In one or more embodiments, an exhaust gas stream 22 enters the inlet passages 24 and flows toward the outlet end 16 of the wall flow filter 10. The gas can take multiple paths 54, 56, and/or 58 through the filter 10, including passing through 54 the porous walls 13 from the inlet passages 24 to the outlet passages 26, where it can exit the via the outlet end 16 of the filter. In a particular flow pathway 54, the exhaust gas can flow through the second SCR catalyst 43 on the inlet-side surface of the porous walls 13 and through the first SCR catalyst 40 impregnated into the porous walls 13. In another flow pathway 56, some of the exhaust gas 22 can follow pathway 54 through the porous filter wall 13 containing the first SCR catalyst 40 and then contact the oxidation catalyst 45 on the outlet-side surface of the porous filter walls 13 as it exits the filter. For another alternative pathway 58, some of the exhaust gas 22 can diffuse through the porous wall 13 containing the first SCR catalyst 40 and through the oxidation catalyst 45.

In one or more embodiments, each of the catalytic components permeates the porous walls of the catalytic substrate and the catalytic components are interspersed within the walls. In various embodiments, the first SCR catalyst is intermixed with the oxidation catalyst within the porous walls. In various embodiments, the SCR catalyst permeates the porous walls and the majority of oxidation catalyst resides on the surface of the SCR-impregnated porous walls. In various embodiments, the majority of oxidation catalyst resides on the surface of the SCR-impregnated porous walls and is sandwiched between the SCR catalyst permeated porous walls and an overlayer of SCR catalyst. In various embodiments, the oxidation catalyst coating in the second zone is on the surface of the porous walls; and the oxidation catalyst coating in the third zone is sandwiched between the first SCR catalyst coating and the second SCR catalyst coating.

Figure 5:
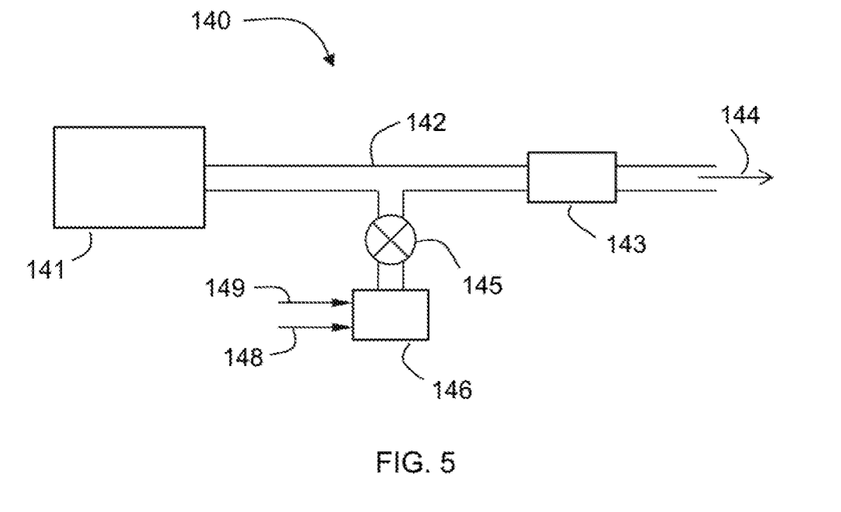
FIG. 5 illustrates an exemplary embodiment of an engine system comprising an emission treatment system and a urea injector.

FIG. 5 illustrates an exemplary embodiment of an engine system comprising an emission treatment system 140 and a urea injector comprising an ammonia precursor feed line 148, an air feed line 149, and a mixing station 146 connected to an in fluid communication with the emission treatment system. As can be seen in FIG. 12, the exhaust containing gaseous pollutants (including unburned hydrocarbons, carbon monoxide and $NO_x$) and particulate matter is conveyed from the engine 141 through a connector 142 to a catalyzed particulate filter 143, as described herein. After the catalyzed particulate filter 143, the exhaust gas exits the system via the tailpipe 144. Downstream of engine 141 a reductant, for example urea, may be injected as a spray via a nozzle (not shown) into the exhaust stream. Aqueous urea shown on one line 148 may serve as the ammonia precursor which can be mixed with air on another line 149 in a mixing station 146. Valve 145 can be used to meter precise amounts of aqueous urea which are converted in the exhaust stream to ammonia. The exhaust stream with the added ammonia is conveyed to the multifunctional, catalyzed particulate filter 143, where the $NH_3$ can interact with an SCR catalyst.

The connector 142 may not be required when no additional components are used before the catalyzed particulate filter 143. In these embodiments, the catalyzed particulate filter 143 is coupled directly to the engine 141. The distance between the engine and catalyst can be quite short resulting in a so-called "close coupled" catalytic arrangement. Alternatively, the distance from the engine to the catalyst can be longer, resulting in an "underfloor" configuration.

Figure 6:
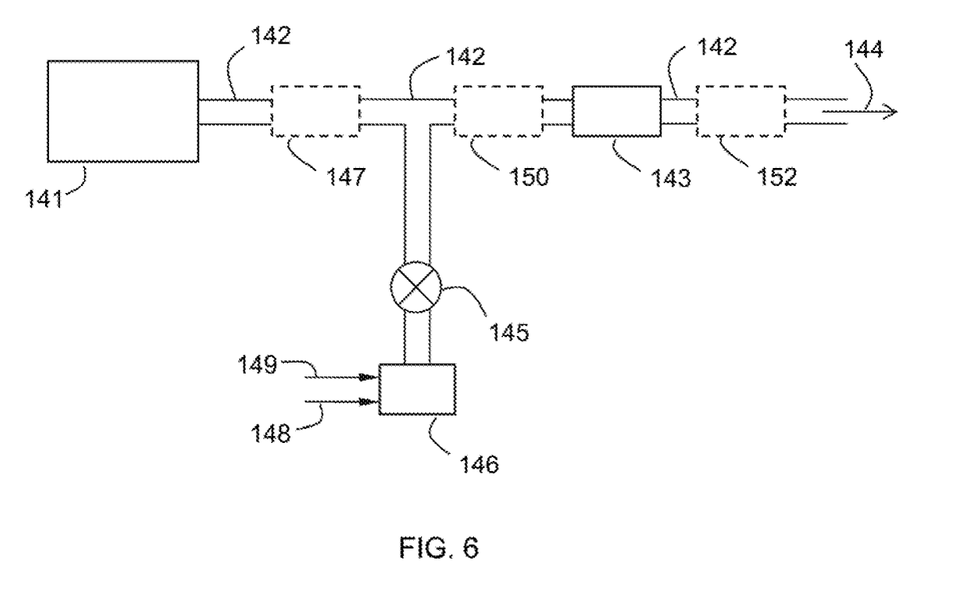
FIG. 6 illustrates another exemplary embodiment of an engine system comprising an emission treatment system, a urea injector, and other engine components.

FIG. 6 illustrates another exemplary embodiment of an engine system comprising an emission treatment system, a urea injector, and other engine components. As shown in FIG. 6, some embodiments of the treatment system include one or more separate components 147. These optional components 147 can include one or more of a diesel oxidation catalyst, lean $NO_x$ trap, partial $NO_x$ adsorber or three-way catalyst. Depending on the desired level of $NO_x$ removal, additional SCR catalyst 150 can be disposed upstream of the multifunctional catalyzed particulate filter 143. For example, the additional SCR catalyst may be disposed on a monolithic, honeycomb flow through substrate or ceramic foam substrate upstream of the soot filter. Depending on the desired level of $NO_x$ removal, additional SCR catalyst 152 can be disposed downstream of the multifunctional catalyzed particulate filter 143, and may also contain an additional AMOx catalyst. Even in these various embodiments, the use of the multifunctional coated SCR soot filter still achieves a reduction in the total volume of catalyst required to meet $NO_x$ reduction goals. Depending on the desired level of hydrocarbon removal, additional oxidation catalysts can be disposed upstream of exhaust component 147 or downstream with exhaust component 152. In various embodiments, an oxidation catalyst would not be provided with component 150, because this would also oxidize the injected urea to $NO_x$.

Catalyst Examples:

The disclosed non-limiting examples illustrate particular spatial arrangements and loadings of catalytic material(s) on a catalytic substrate. It is to be understood that the invention is not limited to the recited arrangements, details of construction, or process steps set forth in the following description of the examples, and that the invention is capable of other embodiments and of being practiced or being carried out in various ways.

Sample Preparation for Samples 1 to 6:

Non-limiting Examples 1 to 6 are summarized in Table 1. This matrix of examples involves "face painting" of catalytic materials. Unlike washcoating, where catalyst materials penetrate into the porous media of the filter, face painting applies catalyst only on the face (or exposed edge) of the filter by painting catalyst paste with a brush or a roller. Therefore, the catalyst materials are not expected to penetrate the filter beyond the filter plugs by capillary action. When a washcoat is applied to the end surface by dipping the end of the substrate in a washcoat slurry, the coating extends axially from the end towards the interior of the substrate by capillary force. It can be difficult to precisely control the length of a coating applied by a washcoating technique. However, by using a face painting technique with an applicator such as a roller and a coating that has a viscosity that is the consistency of a paste and higher than the viscosity of a washcoat slurry, the depth or length of the zone applied on the outlet end of a wall flow substrate can be precisely controlled. For Examples 2, 4 and 6, the Pd face paint coating paste was made by first impregnating an $Al_2O_3$ support with Pd nitrate solution to reach a Pd loading of 5.5% by weight; the $Pd/Al_2O_3$ powder was then suspended in water with the addition of 5% alumina binder and 2.5% Zr acetate. The final coating paste has a solid content of 9%. The Pd loading for the face painting shown in Table 8 is based on the entire filter volume. However, the catalyst loadings for other coatings are based on the applied zone (local loading). Drying (110° C. for 1 hour) and calcination (450° C. for 2 h) were applied after each coating, including the face painting.

TABLE 1

Catalyzed Filter Design for Samples 17 to 22

| | First coat design (Inlet coating) | | Second coat design (Outlet coating) | | Face painting (Outlet face) Pd local |
|---|---|---|---|---|---|
| | Cu-CHA (g/in$^3$) | Coverage (%) | Pd loading (g/ft$^3$) | Coverage (%) | loading$^a$ (g/ft$^3$) |
| 1 | 1.0 | 100 | | | |
| 2 | 1.0 | 100 | | | 90 |
| 3 | 1.0 | 100 | 10 | 33 | |
| 4 | 1.0 | 100 | 10 | 33 | 30 |
| 5 | 1.0 | 100 | 10 | 17 | |
| 6 | 1.0 | 100 | 10 | 17 | 6 |

$^a$The Pd loading is based on an estimated catalyst penetration depth of 5 mm.

Performance Evaluation for Samples 1 to 6:

Samples 1 to 6 of Examples 1 to 6 were evaluated with a different feed, which consists of 500 ppm NO, 550 ppm $NH_3$, 500 ppm CO, 10% $O_2$, 5% $H_2O$, 5% $CO_2$ and balance $N_2$. Since the feed contains CO, no separate CO test was performed. Table 2 summarizes the $NO_x$ conversions for Samples 1 to 6. Sample 1 is the SCR. Samples 2 and 5 show comparable or slightly higher $NO_x$ conversions at all temperatures compared to the SCR reference (Sample 1). Other samples show slightly lower $NO_x$ conversions at 500° C. Table 3 compares the $NH_3$ conversions. All samples show substantially higher $NH_3$ conversion compared to the SCR reference with Sample 4 being the most active. Table 4 shows the peak $N_2O$ formation and the CO conversion at 500° C. The peak $N_2O$ formations for all the samples are comparable to that of the SCR reference (6-8 ppm). The CO conversion of the SCR reference is near zero at 500° C., whereas Samples 3, 4 and 6 are much more active (49-76%) for CO conversion.

TABLE 2

$NO_x$ Conversion (%) for Samples 1 to 6

| Sample ID | 200° C. | 300° C. | 400° C. | 500° C. |
|---|---|---|---|---|
| 1 | 20 | 81 | 84 | 83 |
| 2 | 23 | 85 | 87 | 85 |
| 3 | 22 | 82 | 84 | 77 |
| 4 | 22 | 84 | 83 | 73 |
| 5 | 23 | 86 | 87 | 83 |
| 6 | 19 | 81 | 83 | 75 |

TABLE 3

$NH_3$ Conversion (%) for Samples 1 to 6

| Sample ID | 200° C. | 300° C. | 400° C. | 500° C. |
|---|---|---|---|---|
| 1 | 15 | 61 | 67 | 77 |
| 2 | 17 | 65 | 72 | 81 |
| 3 | 17 | 63 | 74 | 87 |
| 4 | 17 | 64 | 79 | 93 |
| 5 | 16 | 65 | 72 | 84 |
| 6 | 15 | 61 | 72 | 87 |

TABLE 4

Peak $N_2O$ Formation and CO Conversion at 500° C. Samples 1 to 6

| | Peak $N_2O$ formation (ppm) | $N_2O$ peak temperature (° C.) | CO conversion at 500° C. (%) |
|---|---|---|---|
| 1 | 7 | 304 | 2 |
| 2 | 7 | 305 | 8 |
| 3 | 6 | 300 | 49 |
| 4 | 8 | 296 | 76 |
| 5 | 8 | 297 | 8 |
| 6 | 8 | 299 | 49 |

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A catalyzed particulate filter comprising:
a plurality of porous walls extending longitudinally to form a plurality of parallel passages extending from an inlet end to an outlet end, wherein a quantity of the passages are inlet passages that are open at the inlet end and closed with an outlet plug at the outlet end, and a quantity of passages are outlet passages that are closed with an inlet plug at the inlet end and open at the outlet end, the outlet plug having a depth and an outlet plug end face, the outlet end defining an outlet end surface of the outlet passages including the outlet plug and the outlet plug end face;
a selective catalytic reduction catalyst applied to the porous walls of the particulate filter; and
a platinum group metal end coating covering the outlet end surface and the outlet end face of the plugs, the platinum group metal end coating which extends a distance less than 1.5 times the depth of the outlet plugs from the outlet end surface and having a platinum group metal local loading in the range of about 20 to about 200 $g/ft^3$.

2. The catalyzed particulate filter of claim 1, wherein the plugs at the outlet end have a length in the range of about 3 mm to about 8 mm.

3. The catalyzed particulate filter of claim 1, the platinum group metal end coating is end face applied by an applicator to only the outlet end surface and the outlet end face of the plugs.

4. The catalyzed particulate filter of claim 3, wherein the applicator is selected from the group consisting of a brush, a roller, a squeegee, and a stamp pad.

5. The catalyzed particulate filter of claim 3, wherein the applicator is a roller.

6. The catalyzed particulate filter of claim 1, wherein the platinum group metal end coating extends a distance equal to or less than the distance of the depth of the outlet plugs from the outlet end surface.

7. The catalyzed particulate filter of claim 1, wherein the platinum group metal end coating loading is in the range of about 20 $g/ft^3$ to about 150 $g/ft^3$.

8. The catalyzed particulate filter of claim 1, wherein the platinum group metal for the end coating is palladium.

9. The catalyzed particulate filter of claim 1, further comprising an oxidation catalyst washcoat, comprising a platinum group metal extending from the outlet end of the passages and for a depth in the range of about 10% to about 50% of the wall length.

10. The catalyzed particulate filter of claim 9, wherein the oxidation catalyst washcoat overlaps with the selective catalytic reduction catalyst.

11. The catalyzed particulate filter of claim 1, wherein the selective catalytic reduction catalyst coating extends the entire length of the porous walls.

12. The catalyzed particulate filter of claim 1, wherein the selective catalytic reduction catalyst coating permeates the porous walls.

13. The catalyzed particulate filter of claim 1, wherein the selective catalytic reduction catalyst comprises a molecular sieve promoted with a base metal.

14. The catalyzed particulate filter of claim 1, wherein the selective catalytic reduction catalyst is a zeolitic framework material promoted with a metal selected from Cu, Fe, Co, Ni, La, Ce, Mn, V, Ag, and combinations thereof.

15. The catalyzed particulate filter of claim 1, wherein the selective catalytic reduction catalyst is a zeolite of the CHA framework promoted with a metal selected from Cu, Fe and combinations thereof.

16. The catalyzed particulate filter of claim 1, wherein the platinum group metal end coating is the only platinum group metal coating on the catalyzed particulate filter.

17. A lean burn engine exhaust system comprising a diesel oxidation catalyst upstream from the catalyzed particulate filter of claim 1.

18. A lean burn engine exhaust system comprising a lean NOx trap upstream from the catalyzed particulate filter of claim 1.

19. A method of making a catalyzed soot filter comprising:
   coating the catalyzed soot filter including a plurality of porous walls extending longitudinally to form a plurality of parallel passages extending from an inlet end to an outlet end, wherein a quantity of the passages are inlet passages that are open at the inlet end and closed with an outlet plug at the outlet end, and a quantity of passages are outlet passages that are closed with an inlet plug at the inlet end and open at the outlet end, the outlet plug having a depth and an outlet plug end face, the outlet end defining an outlet end surface including the outlet plug end face;
   wherein coating the catalyzed soot filter includes washcoating a selective catalytic reduction catalyst washcoat on the porous walls of the soot filter; and
   contacting the outlet plug end face and outlet end surface with an applicator containing a platinum group metal coating so that the platinum group metal coating is transferred from the applicator to the outlet plug end faces and outlet end surfaces.

20. The method of claim 19, wherein the platinum group metal coating extends a distance less than 1.5 times the depth of the outlet plugs from the outlet end surface.

21. The method of claim 19, wherein the platinum group metal coating extends a distance equal to or less than the depth of the outlet plugs.

22. The method of claim 19, wherein the platinum group metal coating has a viscosity which prevents the coating from travelling along the axial length of the porous walls when the platinum group metal coating is transferred from the applicator to the end plug end faces and outlet end surfaces of the porous walls.

23. The method of claim 19, wherein the applicator is selected from the group consisting of a brush, a roller, a squeegee, and a stamp pad.

24. The method of claim 19, wherein the applicator is a roller.

25. The method of claim 19, further comprising washcoating an oxidation catalyst washcoat comprising a platinum group metal which extends from the outlet end of the passages and for a length in the range of about 10% to about 50% of the wall length.

\* \* \* \* \*